(12) United States Patent
Yuk et al.

(10) Patent No.: US 11,122,236 B2
(45) Date of Patent: Sep. 14, 2021

(54) DISPLAY APPARATUS WITH MOVABLE SENSOR MODULE

(71) Applicant: SAMSUNG ELECTRONICS CO., LTD., Suwon-si (KR)

(72) Inventors: Jin Kook Yuk, Hwaseong-si (KR); Doo Soon Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/761,374

(22) PCT Filed: Aug. 30, 2018

(86) PCT No.: PCT/KR2018/010061
§ 371 (c)(1),
(2) Date: May 4, 2020

(87) PCT Pub. No.: WO2019/088433
PCT Pub. Date: May 9, 2019

(65) Prior Publication Data
US 2020/0363863 A1  Nov. 19, 2020

(30) Foreign Application Priority Data

Nov. 3, 2017  (KR) .................. 10-2017-0145995

(51) Int. Cl.
*G06F 3/01* (2006.01)
*H05K 5/00* (2006.01)
(Continued)

(52) U.S. Cl.
CPC ............ *H04N 5/655* (2013.01); *G06F 3/011* (2013.01); *H01L 27/3225* (2013.01);
(Continued)

(58) Field of Classification Search
CPC ............ G02F 1/1333; G02F 1/133314; G02F 1/133317; G02F 1/13332; G02F 1/133325;
(Continued)

(56) References Cited

U.S. PATENT DOCUMENTS

2008/0204359 A1\* 8/2008 Tsui ...................... G06F 1/1601
345/5
2012/0127141 A1\* 5/2012 Choi ......................... H04N 5/64
345/207
2012/0281383 A1\* 11/2012 Hwang .................... H05K 7/02
361/807

FOREIGN PATENT DOCUMENTS

JP  2012-150136  8/2012
JP  2012-242269  12/2012
(Continued)

OTHER PUBLICATIONS

International Search Report dated Dec. 26, 2018, in corresponding International Patent Application No. PCT/KR2018/010061.
(Continued)

*Primary Examiner* — Afroza Chowdhury
(74) *Attorney, Agent, or Firm* — Staas & Halsey LLP

(57) ABSTRACT

The present disclosure relates to a display apparatus. The display apparatus includes a case, a display panel mounted on the case, a sensor device disposed inside the case, and a decoration bezel detachably mounted on the case, wherein the sensor device includes a sensor bracket fixed to the case, and a sensor module movably mounted on the sensor bracket.

14 Claims, 12 Drawing Sheets

(51) Int. Cl.
  *H01L 27/32* (2006.01)
  *H01L 51/52* (2006.01)
  *H04N 5/655* (2006.01)
  *F21V 8/00* (2006.01)
(52) U.S. Cl.
  CPC ....... *H01L 51/5237* (2013.01); *H05K 5/0017* (2013.01); *G02B 6/0051* (2013.01); *G02B 6/0055* (2013.01)
(58) Field of Classification Search
  CPC ................ G06F 3/011; G09G 2300/00; G09G 2354/00; H01L 27/3225; H01L 51/5237; H04N 5/655; H05K 5/0017; G02B 6/0051; G02B 6/0055
  See application file for complete search history.

(56) References Cited

FOREIGN PATENT DOCUMENTS

| | | |
|---|---|---|
| KR | 10-2012-0055433 | 5/2012 |
| KR | 10-2014-0045007 | 4/2014 |
| KR | 10-2017-0078509 | 7/2017 |

OTHER PUBLICATIONS

European Office Action dated Apr. 1, 2021 from European Application No. 18872131.0, 4 pages.

\* cited by examiner

DISPLAY APPARATUS WITH MOVABLE SENSOR MODULE

CROSS-REFERENCE TO RELATED APPLICATIONS

This application is a U.S. National Stage Application which claims the benefit under 35 U.S.C. § 371 of International Patent Application No. PCT/KR2018/010061 filed on Aug. 30, 2018, which claims foreign priority benefit under 35 U.S.C. § 119 of Korean Patent Application No. 10-2017-0145995 filed on Nov. 3, 2017 in the Korean Intellectual Property Office, the contents of both of which are incorporated herein by reference.

TECHNICAL FIELD

The present disclosure relates to a display apparatus, and more particularly, to a display apparatus on which a decoration bezel may be mounted.

BACKGROUND

In general, a display apparatus is a type of output device that visually displays acquired or stored image information to a user, and is used in various fields such as a home or a business.

Recently, display panels displaying content in a display apparatus are having high resolution and becoming large in size. In addition, in a display apparatus, the thickness of a case including a top chassis and a bottom chassis covering the display panel is also getting thinner. That is, a display apparatus is designed to make the thickness of a bezel thin to increase image immersion of the user.

The display apparatus may include a decoration bezel that is detachably mounted on the case in order to improve the design to suit preferences of the user while covering a part where the bezel is placed.

The display apparatus may include a sensor for receiving a signal transmitted by an input device such as a remote control, an illuminance sensor for detecting the brightness around the display apparatus, a color sensor for detecting color, and a motion sensor for detecting the movement of a user.

DISCLOSURE

Technical Problem

The present disclosure is directed to providing a display apparatus capable of receiving a signal from an input device even when a decoration bezel is mounted.

The present disclosure is directed to providing a display apparatus capable of detecting the brightness and/or color of the surroundings even when a decoration bezel is mounted.

The present disclosure is directed to providing a display apparatus capable of detecting the movement of a user even when a decoration bezel is mounted.

The present disclosure is directed to providing a display apparatus including a sensor module whose position changes as a decoration bezel is mounted.

Technical Solution

One aspect of the present disclosure provides a display apparatus including a case, a display panel mounted on the case, a sensor device disposed inside the case, and a decoration bezel detachably mounted on the case, wherein the sensor device includes a sensor bracket fixed to the case, and a sensor module movably mounted on the sensor bracket.

The sensor module may be configured to be positioned in a first position when the decoration bezel is separated from the case and to be positioned in a second position when the decoration bezel is mounted on the case.

The sensor module may be configured to move in a direction protruding to the outside of the case when the decoration bezel is mounted on the case.

The sensor bracket may include a limiting portion configured to limit the movement of the sensor module, and the sensor module may include a limiting protrusion protruding such that the movement from the first position to the second position is limited by the limiting portion.

The limiting protrusion may include an inclined surface pressed by the limiting portion such that the sensor module is movable from the second position to the first position.

The sensor module may include a trigger portion protruding toward the decoration bezel, and the decoration bezel may include a push portion pressing the trigger portion when mounted on the case.

The limiting protrusion may be configured to be separated from the limiting portion when the push portion presses the trigger portion to move from the first position to the second position.

The sensor device may include an elastic member pressing the sensor module in a direction toward the second position.

The sensor bracket may include a guide slit guiding the sensor module such that the sensor module is movable between the first position and the second position, and the sensor module may include a guide protrusion inserted into the guide slit.

The sensor device may be disposed in the rear of the display panel.

The sensor module may be configured such that at least a portion of the sensor module protrudes further outward than the decoration bezel when the sensor module is in the second position.

The sensor module may be configured such that at least a portion of the sensor module protrudes further outward than the case when the sensor module is in the first position.

The sensor device may be disposed at a lower end of the case, and the sensor module may be configured to be movable in the up-down direction.

The second position may be set to be positioned below the first position.

The sensor module may be coupled to the sensor bracket in a snap-fit manner when moving from the second position to the first position.

Another aspect of the present disclosure provides a display apparatus including a case, a sensor device disposed inside the case, and a decoration bezel detachably mounted on the case, wherein the sensor device includes a sensor bracket fixed to the case, and a sensor module configured to be movable with respect to the sensor bracket when the decoration bezel is mounted on the case.

The sensor module may be moved to protrude further than a lower surface of the decoration bezel when the decoration bezel is mounted on the case.

The decoration bezel may include a push portion pressing a portion of the sensor module when mounted on the case.

The sensor bracket may include a guide slit limiting a range of movement of the sensor module, and the sensor module may include a guide protrusion a guide protrusion inserted into the guide slit to be slidingly moved Another aspect of the present disclosure provides a display apparatus including a case, a sensor device disposed inside the case, and a decoration bezel detachably mounted on the case, wherein the sensor device is configured such that at least a portion of the sensor device protrudes further outward than the case when the decoration bezel is separated from the case and at least a portion of the sensor device protrudes further outward than the decoration bezel when the decoration bezel is mounted on the case.

Advantageous Effects

According to the present disclosure, a display apparatus can receive a signal from an input device even when a decoration bezel is mounted because a sensor module moves to protrude outside the display apparatus when the decoration bezel is mounted on a case.

According to the present disclosure, the display apparatus can detect the brightness and/or color of the surroundings of the display apparatus even when the decoration bezel is mounted because the sensor module moves to protrude outside the display apparatus when the decoration bezel is mounted on the case.

According to the present disclosure, the display apparatus can detect the movement of a user even when the decoration bezel is mounted because the sensor module moves to protrude outside the display apparatus when the decoration bezel is mounted on the case.

According to the present disclosure, the display apparatus can change the position of the sensor module just by mounting the decoration bezel because the sensor device includes an elastic member for pressing the sensor module in a direction protruding to the outside of the case and the coupling of the sensor module and the sensor bracket is released as the decoration bezel presses the sensor module.

MODE OF THE INVENTION

Like reference numbers or signs in the various drawings of the application represent parts or components that perform substantially the same functions. This specification does not describe all elements of the embodiments, and the general contents in the technical field to which the present disclosure belong or the overlapping contents between the embodiments are omitted. The terms 'portion,' module, "member," and 'block' used in the specification may be implemented by software or hardware, and according to embodiments, a plurality of 'portions', 'modules', 'members', and 'blocks' may be implemented as one component, or one 'portion,' 'module,' 'member,' and 'block' may include a plurality of components.

Throughout the specification, when a portion is described as being "connected" to another portion, this includes the case of being indirectly connected as well as being connected directly, and the indirect connection includes connecting through a wireless communication network.

When a portion is described as "comprising" a component, this means that other components may be further included rather than excluding other components unless otherwise specified.

Throughout the specification, when a member is described as being positioned "above" another member, this includes not only the case where one member is in contact with another member, but also the case where another member exists between the two members.

The terms first, second, etc. are used to distinguish one component from other components, and the component is not limited by these terms.

The singular expressions herein may include plural expressions, unless the context clearly dictates otherwise.

In each step, the identification number is used for convenience of description, and the identification number does not describe the order of each step. Each step may be performed differently from the specified order, unless a specific order is explicitly described in the context. Hereinafter, principles and embodiments of the present disclosure will be described with reference to the accompanying drawings.

Figure 1:
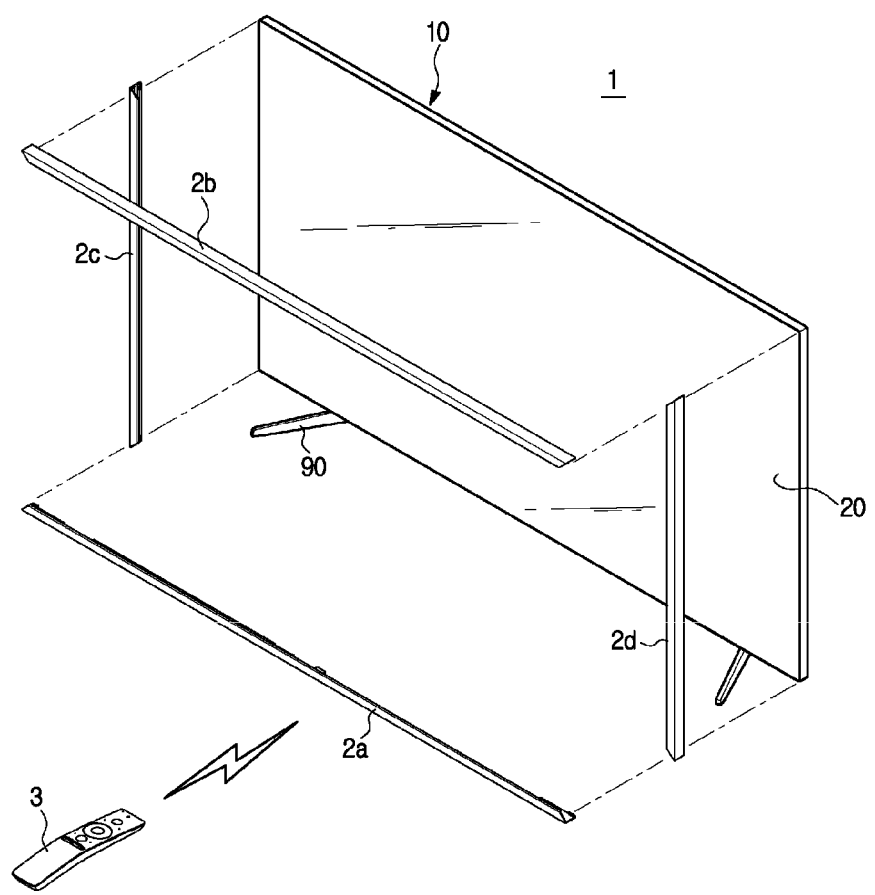
FIG. 1 illustrates an outer appearance of a display apparatus according to an embodiment of the present disclosure.
Figure 2:
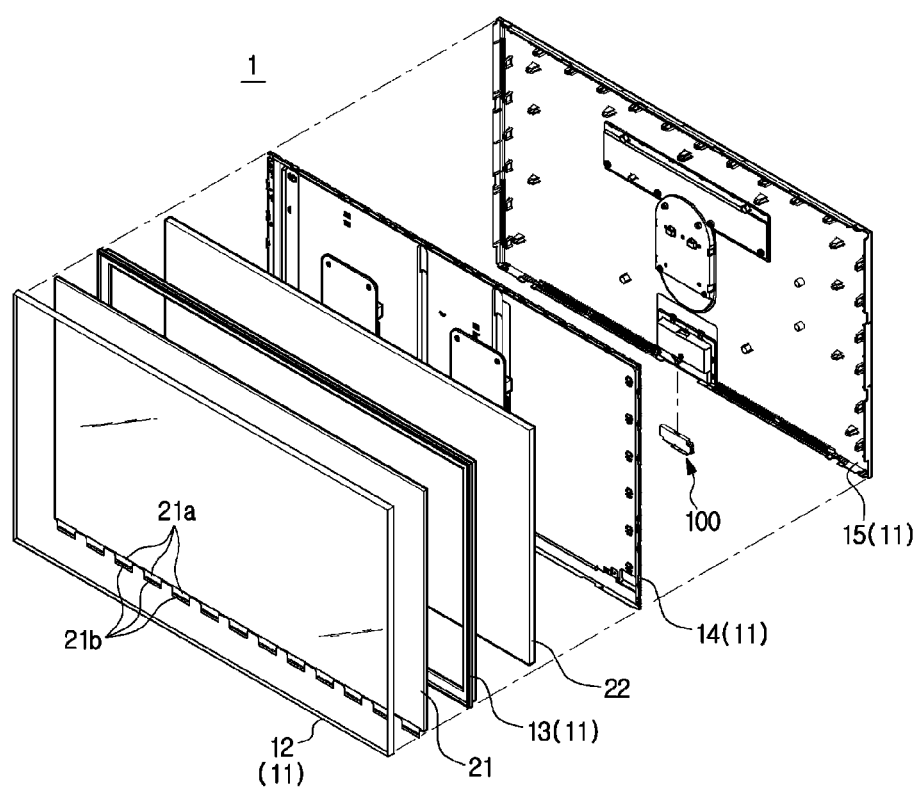
FIG. 2 is an exploded view of the display apparatus illustrated in FIG. 1.

FIG. 1 illustrates an outer appearance of a display apparatus according to an embodiment of the present disclosure. FIG. 2 is an exploded view of the display apparatus illustrated in FIG. 1.

A display apparatus 1 is a device capable of processing an image signal received from the outside and visually displaying the processed image. Hereinafter, the case where the display apparatus 1 is a television (TV) is illustrated, but is not limited thereto. For example, the display apparatus 1 may be implemented in various forms such as a monitor, a portable multimedia device, a portable communication device, and a portable computing device, and when the display apparatus 1 is a device that visually displays an image, a form thereof is not limited.

Also, the display apparatus 1 may be a large format display (LFD) installed outdoors, such as a roof of a building and a bus stop. The outdoors are not necessarily limited to the outside, and the display apparatus 1 according to an embodiment of the present disclosure may be installed in a place where a large number of people may enter or exit even in an indoor environment, such as a subway station, a shopping mall, a movie theater, a company, a shop, and the like.

The display apparatus 1 may receive a video signal and an audio signal from various content sources and output video and audio corresponding to the video signal and the audio signal. For example, the display apparatus 1 may receive television broadcast content through a broadcast reception antenna or a wired cable, receive content from a content playback device, or receive content from a content providing server of a content provider.

As illustrated in FIG. 1, the display apparatus 1 may include a main body 10, a screen 20 displaying an image, and a support 90 provided below the main body 10 to support the main body 10.

The main body 10 forms an outer shape of the display apparatus 1, and components necessary for the display apparatus 1 to display an image may be provided inside the main body 10. FIG. 1 illustrates that the main body is formed in a flat plate shape, but the shape of the main body is not limited to that illustrated in FIG. 1. For example, the main body may have a shape in which both right and left ends protrude forward and the center thereof is concave.

The screen 20 is formed on a front surface of the main body 10, and an image that is visual information may be displayed on the screen 20. For example, a still image or a video may be displayed on the screen 20, and a 2D flat image or a 3D stereoscopic image may be displayed.

A plurality of pixels P is formed on the screen 20, and an image displayed on the screen 20 may be formed by a combination of light emitted from the plurality of pixels P. For example, one image may be formed on the screen 20 by combining light emitted from a plurality of pixels P like a mosaic.

Each of the plurality of pixels P may emit light of various brightness and various colors.

In order to emit light of various levels of brightness, each of the plurality of pixels P may include a configuration (e.g., an organic light emitting diode) capable of directly emitting light, or may include a configuration (e.g., a display panel) capable of transmitting or blocking light emitted by the backlight unit or the like.

In order to emit light of various colors, each of the plurality of pixels P may include subpixels $P_R$, $P_G$, and $P_B$.

The subpixels $P_R$, $P_G$, and $P_B$ may include the red subpixel $P_R$ capable of emitting red light, the green subpixel $P_G$ capable of emitting green light, and the blue subpixel $P_B$ capable of emitting blue light. For example, red light may exhibit light having a wavelength of about 620 nm (nanometer, one billionth of a meter) to 750 nm, green light may exhibit light having a wavelength of about 495 nm to 570 nm, and blue light may exhibit light having a wavelength of about 450 nm to 495 nm.

By a combination of red light of the red subpixel $P_R$, green light of the green subpixel $P_G$ and blue light of the blue subpixel $P_B$, each of the plurality of pixels P may emit light having various levels of brightness and various colors.

FIG. 1 illustrates that the screen 20 is formed in a flat plate shape, but the shape of the screen 20 is not limited to that illustrated in FIG. 1. For example, according to the shape of the main body 10, the screen 20 may have a shape in which both right and left ends protrude forward and the center thereof is concave.

The support 90 is installed below the main body 10 such that the main body 10 may maintain a stable posture on a floor surface. Alternatively, the support 90 may be installed on a rear surface of the main body 10 such that the main body 10 may be securely fixed to a wall surface.

As illustrated in FIG. 2, various components for generating an image on the screen 20 may be provided inside the main body 10.

For example, the main body 10 is provided with a backlight unit 22 configured to emit surface light forward, a display panel 21 configured to block or transmit light emitted from the backlight unit 22, and a power supply/control unit 30 configured to control the operation of the backlight unit 22 and the display panel 21. Also, the main body 10 may be provided with a case 11 configured to support and fix the display panel 21, the backlight unit 22 and the power supply/control unit 30. The case 11 may include a bezel 12, a frame middle mold 13, a bottom chassis 14, and a rear cover 15. The display panel 21 may be mounted on the case 11.

The backlight unit 22 may include a point light source emitting monochromatic light or white light and may refract, reflect, and scatter light to convert light emitted from the point light source into uniform surface light.

For example, the backlight unit 22 may include a light source emitting monochromatic light or white light, a light guide plate through which light is incident from the light source and diffusing the incident light, a reflective sheet reflecting the light emitted from a rear surface of the light guide plate, and an optical sheet refracting and scattering light emitted from a front surface of the light guide plate.

As such, the backlight unit 22 may emit uniform surface light toward the front by refracting, reflecting, and scattering light emitted from the light source.

The display panel 21 is provided in the front of the backlight unit 22 and blocks or transmits light emitted from the backlight unit 22 to form an image.

A front surface of the display panel 21 forms the screen 20 of the display apparatus 1 described above may be composed of the plurality of pixels P. The plurality of pixels P included in the display panel 21 may independently block or transmit light from the backlight unit 22, and light transmitted by the plurality of pixels P may form an image displayed on the display apparatus 1.

The power supply/control unit 30 may include a power supply circuit supplying power to the backlight unit 22 and the display panel 21, and a control circuit controlling the operation of the backlight unit 22 and the display panel 21.

The power supply circuit may supply power to the backlight unit 22 such that the backlight unit 22 may emit surface light and may supply power to the display panel 21 such that the display panel 21 may transmit or block light.

The control circuit may control the backlight unit 22 to adjust the intensity of light emitted by the backlight unit 22 and may control the display panel 21 to display an image on the screen 20.

For example, the control circuit may control the display panel 21 to display an image by a video signal received from content sources. Each of the plurality of pixels P included in the display panel 21 transmits or blocks light according to image data of the control circuit, and as a result, an image is displayed on the screen 20.

The power supply/control unit 30 may be implemented as a printed circuit board and various circuits mounted on the printed circuit board. For example, the power supply circuit may include a capacitor, a coil, a resistance element, a microprocessor, and the like, and a power supply circuit board on which these components are mounted. The control circuit may include a memory, a microprocessor and a control circuit board on which these components are mounted.

A cable 21a transmitting image data from the power supply/control unit 30 to the display panel 21 and a display driver integrated circuit (DDI) 21b (hereinafter referred to as a 'display drive unit') processing the image data are provided between the display panel 21 and the power supply/control unit 30.

The cable 21a may electrically connect the power supply/control unit 30 and the display drive unit 21b and may electrically connect the display drive unit 21b and the display panel 21.

The display drive unit 21b may receive image data from the power supply/control unit through the cable 21a and may transmit the image data to the display panel 21 through the cable 21a.

The cable 21a may be implemented as a film cable that may be bent by an external force, and the cable 21a and the display drive unit 21b may be integrally implemented by a film cable, a chip on film (COF), a tape carrier packet (TCP), or the like. In other words, the display drive unit 21b may be disposed on the cable 21a.

However, the present disclosure is not limited thereto, and the display drive unit 21b may be disposed on the display panel 21. The display apparatus 1 may include a sensor device 100 for receiving a signal transmitted from an input device 3, detecting ambient brightness and color of the display apparatus 1, or detecting the movement of a user. The sensor device 100 may be disposed inside the case 11. Specifically, the sensor device 100 may be disposed substantially at a central portion of a lower end of the case 11. However, the position of the sensor device 100 is not limited thereto, and the sensor device 100 may be disposed on one side of the lower end of the case 11 or may be disposed on a left end, a right end, or an upper end of the case 11. The sensor device 100 may be disposed in the rear of the display panel 21.

The case 11 may be equipped with one or more decoration bezels 2a, 2b, 2c, and 2d. The decoration bezels 2a, 2b, 2c, and 2d may have various designs and/or patterns according to the preference of the user. The decoration bezels 2a, 2b, 2c, and 2d may be detachably mounted on the case 11 such that the user may mount the various decoration bezels 2a, 2b, 2c, and 2d on the case 11 as needed. The decoration bezels 2a, 2b, 2c, and 2d may include the lower end decoration bezel 2a configured to be mounted on a lower end of the display apparatus 1, the upper end decoration bezel 2b configured to be mounted on an upper end of the display apparatus 1, the left end decoration bezel 2c configured to be mounted on a left end of the display apparatus 1, and the right end decoration bezel 2d configured to be mounted on a right end of the display apparatus 1.

Figure 3:
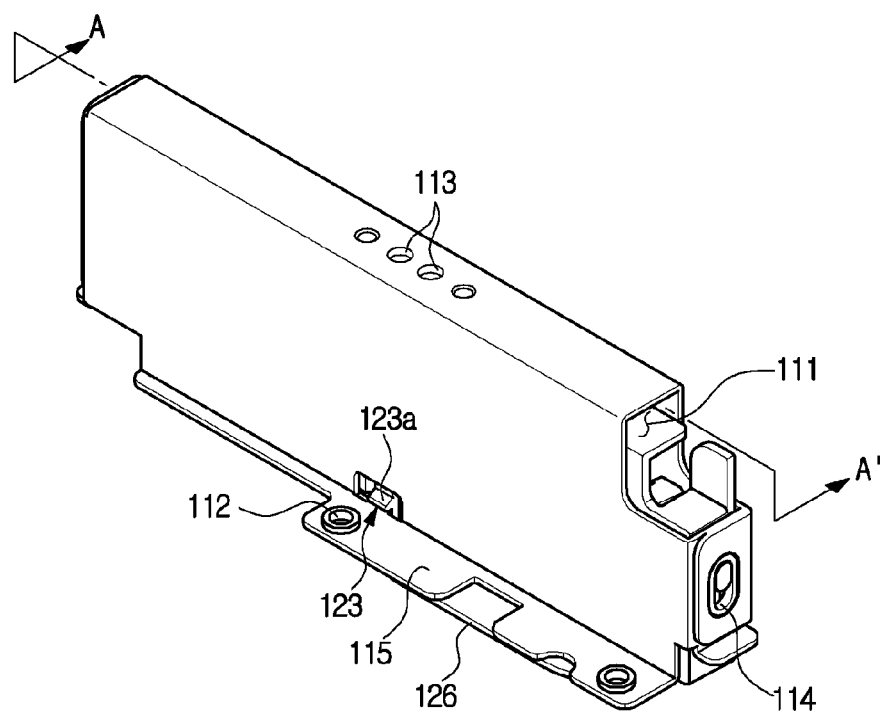
FIG. 3 illustrates a state in which a sensor module of a sensor device illustrated in FIG. 2 is positioned in a first position.
Figure 4:
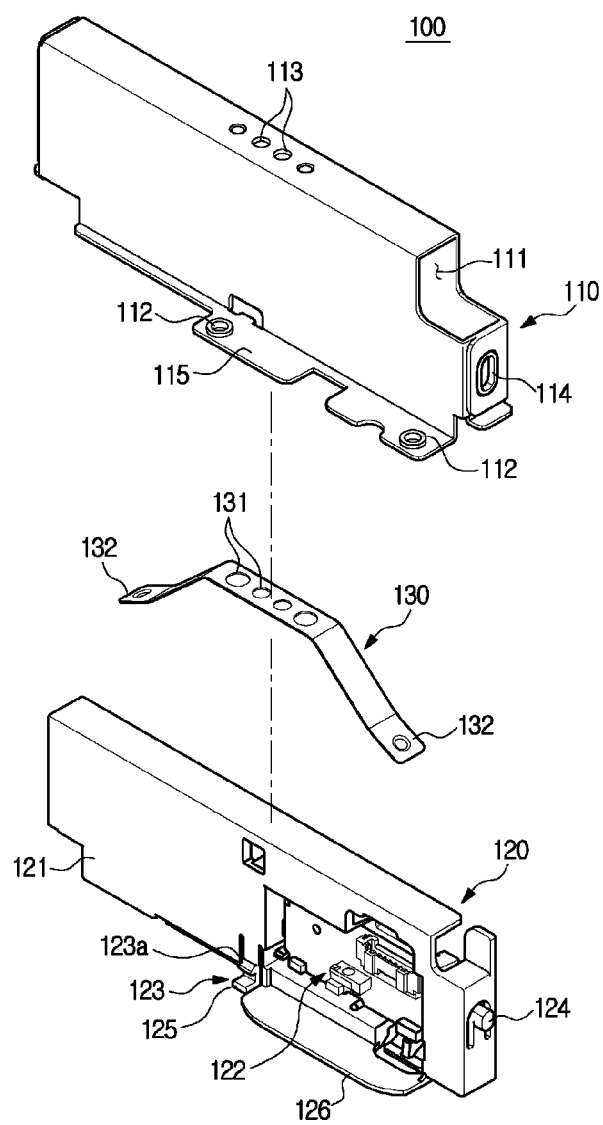
FIG. 4 is an exploded view of the sensor device illustrated in FIG. 3.

FIG. 3 illustrates a state in which a sensor module of a sensor device illustrated in FIG. 2 is positioned in a first position. FIG. 4 is an exploded view of the sensor device illustrated in FIG. 3.

Hereinafter, a state of the sensor device 100 when the decoration bezels 2a, 2b, 2c, and 2d are not mounted on the case 11 will be described with reference to FIGS. 3 and 4. In this embodiment, because the sensor device 100 is disposed at the lower end of the case 11, hereinafter, for convenience of description, the lower end decoration bezel 2a will be referred to as the decoration bezel 2a.

As illustrated in FIGS. 3 and 4, the sensor device 100 may include a sensor bracket 110, a sensor module 120, and an elastic member 130.

The sensor bracket 110 may be configured to cover the sensor module 120. The sensor bracket 110 may include an accommodation space 111 in which the sensor module 120 is accommodated. The accommodation space 111 may be provided to correspond to the size and/or shape of the sensor module 120. The sensor bracket 110 may be formed in a box shape with an open lower surface.

The sensor bracket 110 may be fixed to the case 11. The sensor bracket 110 may be fixed to the bezel 12. The sensor bracket 110 may include a sensor fastening hole 112 to be fixed to the case 11. The bezel 12 may include a bezel fastening hole 12a disposed to correspond to the sensor fastening hole 112 of the sensor bracket 110. The sensor bracket 110 may be fixed to the bezel 12 as the sensor fastening hole 112 is positioned to correspond to the bezel fastening hole 12a and then a fastening member such as a screw is fastened to the sensor fastening hole 112 and the bezel fastening hole 12a. However, the sensor bracket 110 is not limited thereto, and may be fixed to the bezel 12 in various methods. In addition, the sensor bracket 110 may be fixed to the frame middle mold 13, the bottom chassis 14 or the rear cover 15.

The sensor fastening hole 112 may be formed on a bent limiting portion 115 of a lower end of the sensor bracket 110. A plurality of the sensor fastening holes 112 may be provided.

The sensor bracket 110 may include an elastic member fixing portion 113 to which the elastic member 130 is fixed. The elastic member fixing portion 113 may be disposed on an upper end of the sensor bracket 110. The elastic member 130 may be fixed to the sensor bracket 110 as the elastic member fixing portion 113 is positioned to correspond to a bracket fixing portion 131 of the elastic member 130 and then a fastening member such as a screw is fastened to the elastic member fixing portion 113 and the bracket fixing portion 131. However, the elastic member 130 is not limited to the above-described method and may be fixed to the sensor bracket 110 in various methods.

The sensor bracket 110 may include a guide slit 114 into which a guide protrusion 124 of the sensor module 120 is inserted. The guide slit 114 may be formed in a predetermined length in the up-down direction. The guide slit 114 may guide the guide protrusion 124 of the sensor module 120 such that the sensor module 120 is movable between a first position and a second position. A width of the guide slit 114 may be formed to correspond to a size of the guide protrusion 124. Accordingly, the guide slit 114 may prevent the movement of the sensor module 120 in the front-rear direction.

The sensor bracket 110 may include the limiting portion 115 protruding to limit the movement of the sensor module 120. The limiting portion 115 may be formed by bending the lower end of the sensor bracket 110. The limiting portion 115 may support a limiting protrusion 123 when the sensor module 120 is in the first position and allow the sensor module 120 to be fixed in the first position. That is, the limiting portion 115 may fix the sensor module in position such that the sensor module 120 does not move from the first position to the second position.

Figure 8:
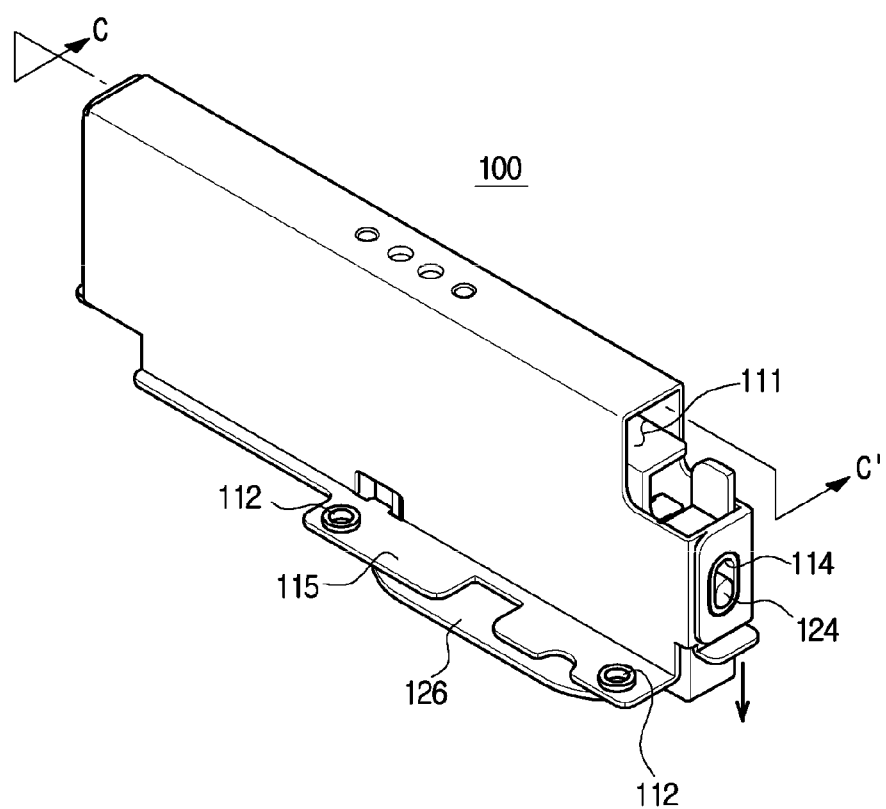
FIG. 8 illustrates a state in which the sensor module of the sensor device illustrated in FIG. 2 is positioned in a second position.

The sensor module 120 may be movably mounted on the sensor bracket 110. The sensor module 120 may be positioned in the first position as illustrated in FIG. 3 when the decoration bezel 2a is separated from the case 11, and may be positioned in the second position as illustrated in FIG. 8 when the decoration bezel 2a is mounted on the case 11. A portion of the sensor module 120 may protrude more toward the outside of the case 11 at the second position than at the first position. That is, the sensor module 120 may be configured to move in a direction protruding to the outside of the case 11 when the decoration bezel 2a is mounted on the case 11. The second position is a position in which the sensor module 120 moves further in a lower direction than the first position.

The sensor module 120 includes a sensor body 121, a printed circuit board 122 (PCB), the limiting protrusion 123, the guide protrusion 124, a trigger portion 125, and a sensor portion 126.

The sensor body 121 may be provided in a size and/or shape substantially similar to the accommodation space 111 to be accommodated in the accommodation space 111 of the sensor bracket 110.

The PCB 122 may be configured to electrically convert information detected by the sensor portion 126 to transmit the detected information to a main controller (not shown).

The limiting protrusion 123 may prevent the sensor module 120 from moving from the first position to the second position by the limiting portion 115 of the sensor bracket 110. The limiting protrusion 123 may protrude outward from the sensor body 121. The limiting protrusion 123 may be supported by the limiting portion 115 when the sensor module 120 is in the first position. The limiting protrusion 123 may be separated from the limiting portion 115 when a push portion 2a' presses the trigger portion 125 to allow the sensor module 120 to move from the first position to the second position.

The limiting protrusion 123 may include an inclined surface 123a pressed by the limiting portion 115 such that the sensor module 120 may move from the second position to the first position. The inclined surface 123a may be provided to be inclined with respect to a direction in which the sensor module 120 moves from the second position to the first position. The inclined surface 123a may be formed on the opposite surface of one surface of the limiting protrusion 123 supported by the limiting portion 115 when the sensor module 120 is in the first position. The inclined surface 123a may be formed on a surface coming into contact with the limiting portion 115 when the sensor module 120 moves from the second position to the first position.

The guide protrusion 124 may protrude to be inserted into the guide slit 114 of the sensor bracket 110. The guide protrusion 124 may slide on the guide slit 114. The size of the guide protrusion 124 may be provided to correspond to the width of the guide slit 114. Accordingly, the guide protrusion 124 may move only in the up-down direction on the guide slit 114. The guide protrusion 124 may be positioned at an upper end of the guide slit 114 when the sensor module 120 is in the first position and may be positioned at a lower end of the guide slit 114 when the sensor module 120 is in the second position.

The trigger portion 125 may protrude from the sensor body 121 toward the decoration bezel 2a. The trigger portion 125 may be pressed by the push portion 2a' of the decoration bezel 2a when the decoration bezel 2a is mounted. As the trigger portion 125 is pressed, the limiting protrusion 123 also moves backward, and thus the coupling of the limiting protrusion 123 and the limiting portion 115 may be released. The push portion 2a' of the decoration bezel 2a may be disposed to correspond to the trigger portion 125.

The sensor portion 126 is disposed at the lower end of the sensor module 120 and may receive a signal transmitted from the input device 3, detect ambient brightness and color, or detect the movement of the user. The sensor portion 126 may include an infrared sensor (IR-sensor), an illuminance sensor, a color sensor, and a motion sensor. The sensor portion 126 may be disposed below a lower surface of the case 11 when the sensor module 120 is in the first position.

That is, when the sensor module 120 is in the first position, the sensor portion 126 may protrude more than the lower surface of the case 11. On the other hand, when the sensor module 120 is in the second position, the sensor portion 126 may be disposed below a lower surface of the decoration bezel 2a. That is, when the sensor module 120 is in the second position, the sensor portion 126 may protrude more than the lower surface of the decoration bezel 2a.

The elastic member 130 may be configured to press the sensor module 120 in a direction toward the second position. The elastic member 130 may include a leaf spring. The elastic member 130 may include the bracket fixing portion 131 to be fixed to the sensor bracket 110, and a module contact portion 132 to be in contact with the sensor module 120 and press the sensor module 120.

The bracket fixing portion 131 may be formed substantially in a central portion of the elastic member 130. The bracket fixing portion 131 may be formed to correspond to the elastic member fixing portion 113 of the sensor bracket 110. As the bracket fixing portion 131 is disposed to correspond to the elastic member fixing portion 113 and then a fastening member such as a screw is fastened, the elastic member 130 may be fixed to the sensor bracket 110.

The module contact portion 132 may be disposed at opposite ends of the elastic member 130. The module contact portion 132 may be in contact with an upper surface of the sensor body 121. The module contact portion 132 may slide on the upper surface of the sensor body 121 as the sensor module 120 moves between the first position and the second position.

Figure 5:
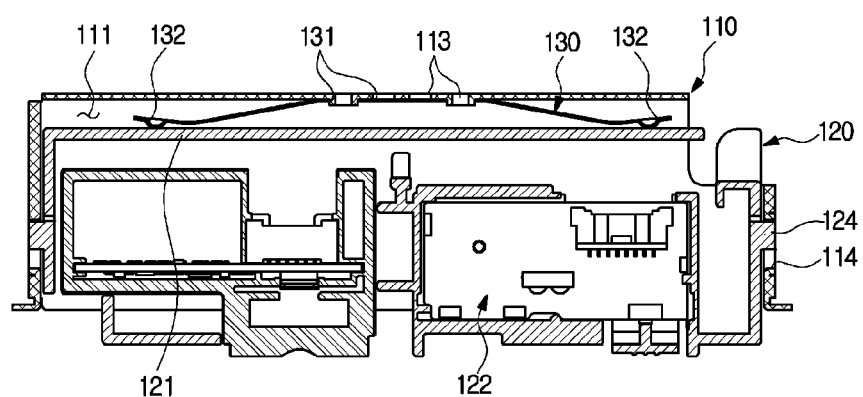
FIG. 5 is a cross-sectional view taken along line A-A' in FIG. 3.
Figure 6:
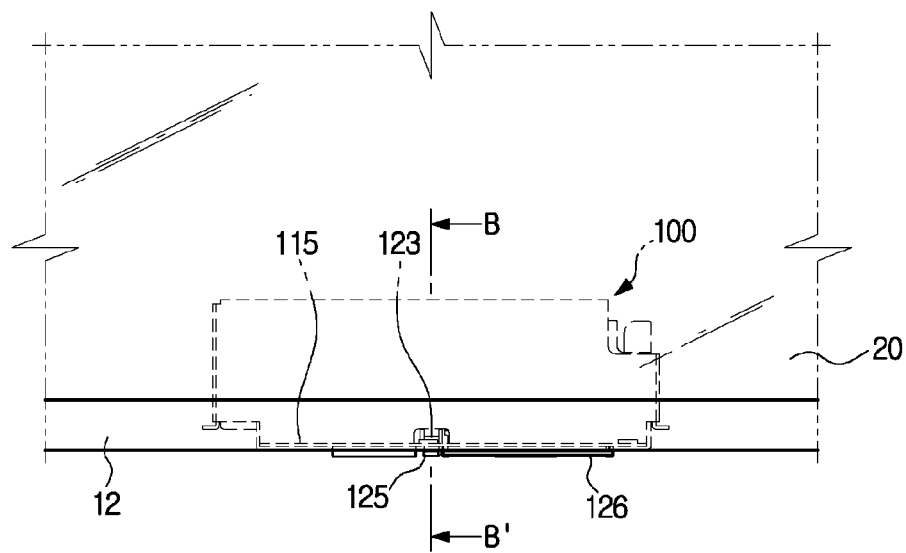
FIG. 6 is a front view illustrating a state of the sensor device when a decoration bezel is separated from a case in the display apparatus illustrated in FIG. 1.
Figure 7:
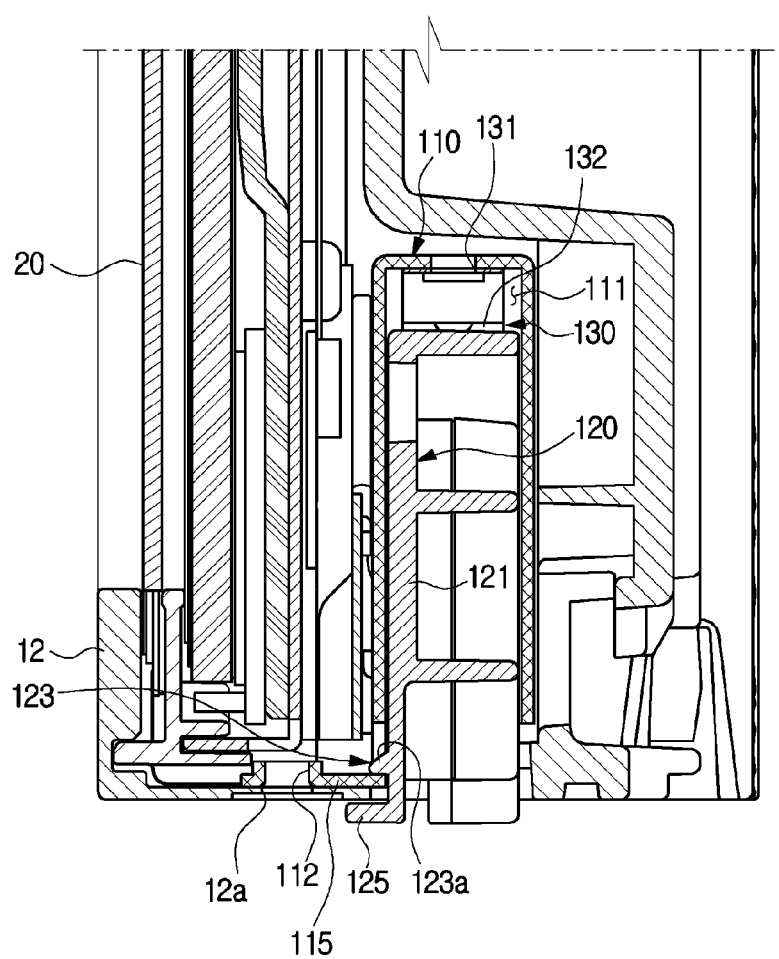
FIG. 7 is a cross-sectional view taken along line B-B' in FIG. 6.
Figure 9:
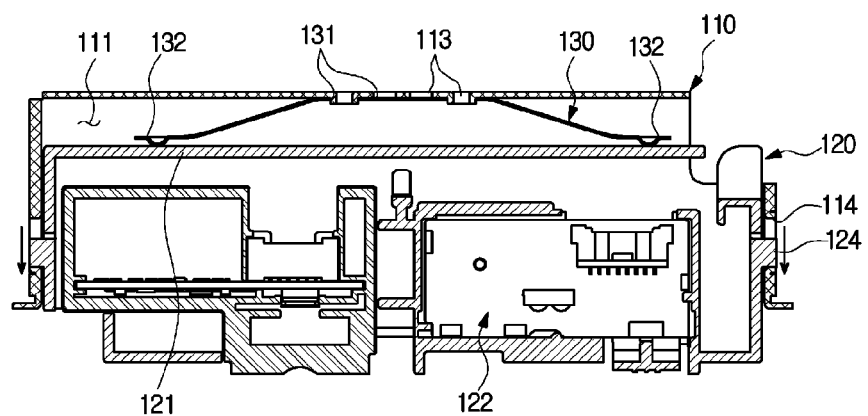
FIG. 9 is a cross-sectional view taken along line C-C' in FIG. 8.
Figure 10:
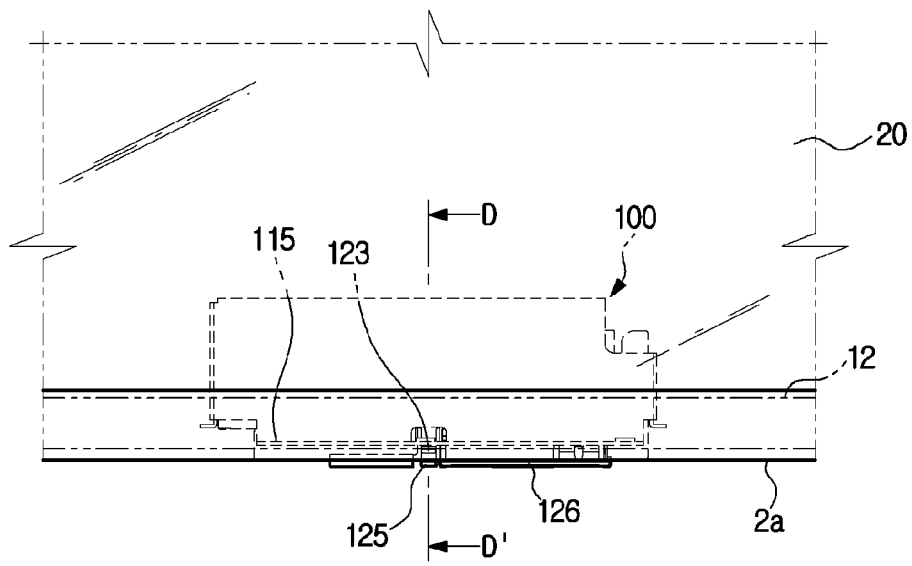
FIG. 10 is a front view illustrating a state of the sensor device when the decoration bezel is coupled to the case in the display apparatus illustrated in FIG. 1.
Figure 11:
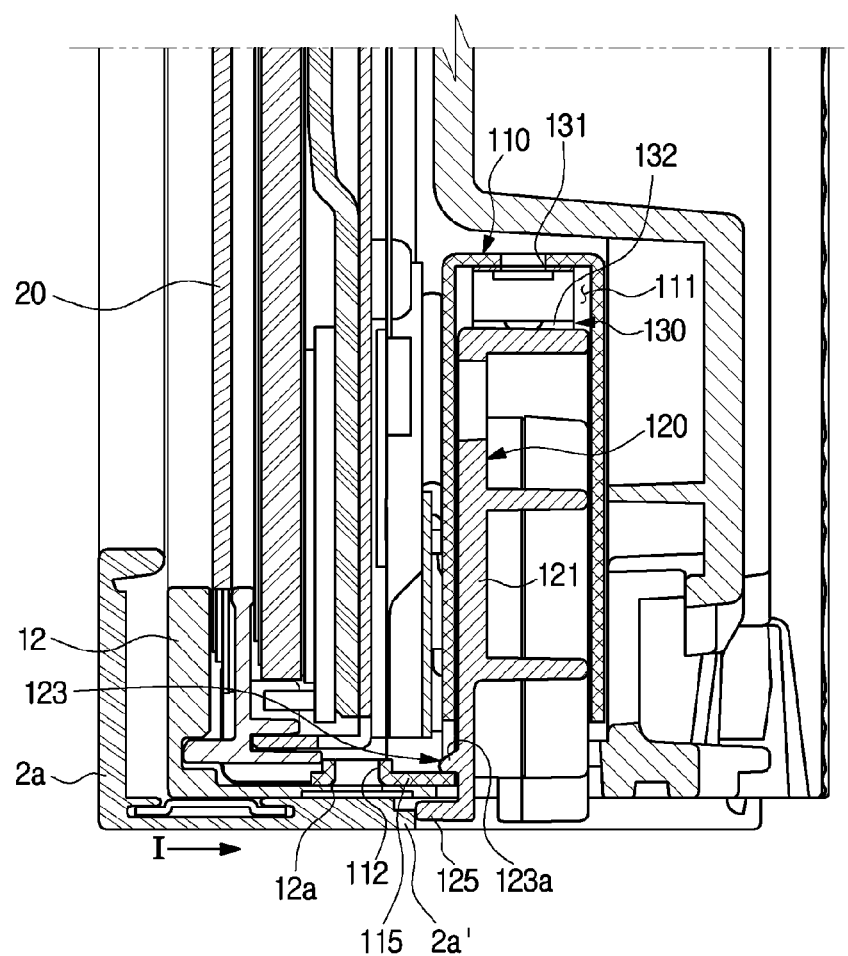
FIG. 11 illustrates a state in which the decoration bezel is coupled to the case and presses a trigger portion of the sensor module as a cross-sectional view taken along line D-D' in FIG. 10.
Figure 12:
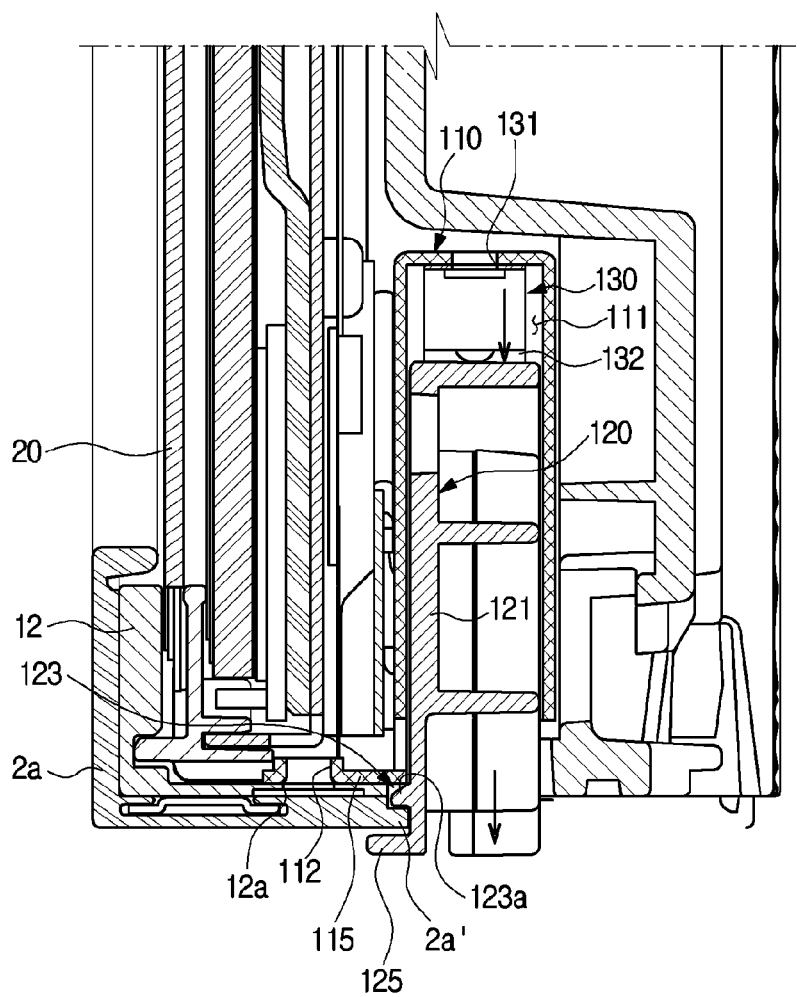
FIG. 12 is a cross-sectional view taken along line D-D' in FIG. 10.

FIG. 5 is a cross-sectional view taken along line A-A' in FIG. 3. FIG. 6 is a front view illustrating a state of the sensor device when a decoration bezel is separated from a case in the display apparatus illustrated in FIG. 1. FIG. 7 is a cross-sectional view taken along line B-B' in FIG. 6. FIG. 8 illustrates a state in which the sensor module of the sensor device illustrated in FIG. 2 is positioned in a second position. FIG. 9 is a cross-sectional view taken along line C-C' in FIG. 8. FIG. 10 is a front view illustrating a state of the sensor device when the decoration bezel is coupled to the case in the display apparatus illustrated in FIG. 1. FIG. 11 illustrates a state in which the decoration bezel is coupled to the case and presses a trigger portion of the sensor module as a cross-sectional view taken along line D-D' in FIG. 10. FIG. 12 is a cross-sectional view taken along line D-D' in FIG. 10.

Hereinafter, the movement of the sensor module 120 will be described with reference to FIGS. 5 to 12.

Referring to FIGS. 5 to 7, when the decoration bezel 2a is not mounted on the display apparatus 1, the sensor module 120 may be positioned in the first position. In the first position, the sensor module 120 may protrude further a predetermined length than the lower surface of the bezel 12. In the first position, the elastic member 130 is stretched to be in a state having an elastic force. In the first position, the limiting protrusion 123 may be supported in the upward direction by the limiting portion 115. Accordingly, even when the elastic member 130 presses the sensor module 120 in the downward direction, the sensor module 120 may be fixed in the first position. The guide protrusion 124 may be positioned at the upper end of the guide slit 114.

Referring to FIGS. 8 to 12, when the decoration bezel 2a is mounted on the display apparatus 1 (I direction), the sensor module 120 may be positioned in the second position. In the second position, the sensor module 120 may protrude further downward a predetermined length than the lower surface of the decoration bezel 2a. In the second position, the elastic member 130 may press the sensor module 120 downward in a more contracted state than in the first position.

Referring to FIG. 11, as the push portion 2a' of the decoration bezel 2a pushes the trigger portion 125, the limiting protrusion 123 is separated from the limiting portion 115. At this time, the sensor module 120 is lowered by the elastic force of the elastic member 130. In this case, the sensor module 120 may be lowered until the guide protrusion 124 is positioned at the lower end of the guide slit 114. That is, in the second position, the guide protrusion 124 is positioned at the lower end of the guide slit 114 and may be supported by the guide slit 114.

When separating the decoration bezel 2a from the case 11, the user may move the sensor module 120 from the second position to the first position by applying an upward force to the lower surface of the sensor module 120. At this time, the inclined surface 123a of the limiting protrusion 123 is pressed by the limiting portion 115 and pushed backward, and then may be coupled to the limiting portion 115. That is, the sensor module 120 may be coupled to the sensor bracket 110 in a snap-fit manner when moving from the second position to the first position.

According to this configuration, even when the decoration bezel 2a is mounted on the display apparatus 1 of the present disclosure, the sensor portion 126 of the sensor device 100 is not covered, so that the sensor device 100 may receive a signal from the input device 3.

While the present disclosure has been particularly described with reference to exemplary embodiments, it should be understood by those of skilled in the art that various changes in form and details may be made without departing from the spirit and scope of the present disclosure.

The invention claimed is:

1. A display apparatus comprising:
   a main body;
   a display panel mounted on the main body;
   a sensor device inside the main body; and
   a decoration bezel detachably mounted on the main body, wherein the sensor device comprises:
      a sensor bracket fixed to the main body; and
      a sensor module mounted on the sensor bracket and configured to be movable with respect to the sensor bracket, the sensor module being configured to be positioned in a first position when the decoration bezel is separated from the main body and to be positioned in a second position when the decoration bezel is mounted on the main body.

2. The display apparatus according to claim 1, wherein the sensor module is configured to move in a direction protruding to the outside of the main body when the decoration bezel is mounted on the main body.

3. The display apparatus according to claim 2, wherein the sensor bracket comprises a limiting portion configured to limit the movement of the sensor module, and the sensor module comprises a limiting protrusion protruding such that the movement from the first position to the second position is limited by the limiting portion.

4. The display apparatus according to claim 3, wherein the limiting protrusion comprises an inclined surface pressed by the limiting portion such that the sensor module is movable from the second position to the first position.

5. The display apparatus according to claim 3, wherein the sensor module comprises a trigger portion protruding toward the decoration bezel, and
the decoration bezel comprises a push portion pressing the trigger portion when mounted on the main body.

6. The display apparatus according to claim 5, wherein the limiting protrusion is configured to be separated from the limiting portion when the push portion presses the trigger portion to move from the first position to the second position.

7. The display apparatus according to claim 1, wherein the sensor device comprises an elastic member pressing the sensor module in a direction toward the second position.

8. The display apparatus according to claim 1, wherein the sensor bracket comprises a guide slit guiding the sensor module such that the sensor module is movable between the first position and the second position, and the sensor module comprises a guide protrusion inserted into the guide slit.

9. The display apparatus according to claim 1, wherein the sensor device is disposed in the rear of the display panel.

10. The display apparatus according to claim 1, wherein the sensor module is configured such that at least a portion of the sensor module protrudes further outward than the decoration bezel when the sensor module is in the second position.

11. The display apparatus according to claim 1, wherein the sensor module is configured such that at least a portion of the sensor module protrudes further outward than the main body when the sensor module is in the first position.

12. The display apparatus according to claim 1, wherein the sensor device is disposed at a lower end of the main body, and
the sensor module is configured to be movable in the up-down direction.

13. The display apparatus according to claim 12, wherein the second position is set to be positioned below the first position.

14. The display apparatus according to claim 1, wherein the sensor module is coupled to the sensor bracket in a snap-fit manner when moving from the second position to the first position.

* * * * *